United States Patent [19]

Edmonds, Jr.

[11] 4,393,197

[45] Jul. 12, 1983

[54] ARYLENE SULFIDE POLYMER PREPARATION

[75] Inventor: James T. Edmonds, Jr., Bartlesville, Okla.

[73] Assignee: Phillips Petroleum Company, Bartlesville, Okla.

[21] Appl. No.: 349,276

[22] Filed: Feb. 16, 1982

[51] Int. Cl.$^3$ ............................................. C08G 75/14
[52] U.S. Cl. ................................... 528/388; 528/387; 524/881
[58] Field of Search ................. 528/387, 388; 524/881

[56] References Cited

U.S. PATENT DOCUMENTS

| | | | |
|---|---|---|---|
| 3,783,138 | 12/1972 | Miles et al. | 528/388 |
| 3,786,035 | 1/1974 | Scoggin | 528/388 |
| 3,869,433 | 3/1975 | Campbell | 260/79.1 |
| 3,880,815 | 4/1975 | Moberly | 528/381 |
| 3,884,884 | 5/1975 | Scoggins et al. | 528/360 |
| 4,024,188 | 5/1977 | Campbell et al. | 568/374 |
| 4,038,259 | 7/1977 | Campbell et al. | 528/388 |
| 4,038,262 | 7/1977 | Edmonds, Jr. | 528/388 |
| 4,089,847 | 5/1978 | Edmonds, Jr. et al. | 528/374 |
| 4,096,132 | 6/1978 | Edmonds, Jr. | 528/384 |
| 4,116,947 | 9/1978 | Edmonds, Jr. et al. | 528/388 |

*Primary Examiner*—Melvyn I. Marquis

[57] ABSTRACT

A method for producing arylene sulfide polymer in which a reaction mixture containing at least one polyhalo-substituted aromatic compound, at least one organic amide, at least one alkali metal carboxylate, $H_2S$ and water in an amount up to 5 weight percent of the total of the reaction mixture components is contacted at polymerization conditions for a time sufficient to produce polymer. In a preferred embodiment, at least one alkali metal carboxylate is present in the reaction mixture.

10 Claims, No Drawings

ARYLENE SULFIDE POLYMER PREPARATION

BACKGROUND OF THE INVENTION

This invention relates to methods for producing polymer of arylene sulfide. In one of its aspects, it relates to methods of producing p-phenylene sulfide polymer without requiring a dehydration operation in the process.

Production of polymers of arylene sulfide using reaction components that do not include more than 5 weight percent of the initial reactor charge as water or water of hydration has the advantage of avoiding the expense and time consumption of a dehydration step in the polymerization process.

It is therefore an object of this invention to provide a poly(arylene sulfide) preparation that does not require dehydration of the reaction mixture.

Other aspects, objects and the various advantages of the invention will become apparent upon studying the disclosure and the appended claims.

STATEMENT OF THE INVENTION

A method for producing polymers comprising contacting at polymerization conditions a reaction mixture comprising at least one polyhalo-substituted aromatic compound, at least one organic amide, at least one alkali metal carbonate, $H_2S$, and water in an amount up to 5 weight percent of the total of the other reaction mixture components, and maintaining the reaction mixture at polymerization conditions for a time sufficient to produce polymer.

The components used in the preparation of the arylene sulfide polymer can be charged in any order. However, practical considerations dictate a more preferred charge order of components. Thus, it is presently preferred to charge all of the components except for the hydrogen sulfide to the reactor in any order, seal the reactor, test it with a pressurized inert gas such as nitrogen to determine that there are no leaks, bleed the pressure down to about ambient pressure and charge the hydrogen sulfide.

The alkali metal carbonate can be selected from among lithium carbonate, sodium carbonate, potassium carbonate, rubidium carbonate, cesium carbonate, and mixtures. Sodium carbonate is presently preferred because of ready availability and relatively low cost. The alkali metal carbonate can be anhydrous or can contain preferably not more than about 1 mole water per mole carbonate compound.

p-Dihalobenzenes which can be employed in the process of this invention can be represented by the formula

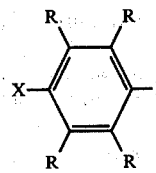

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof. N-methyl-2-pyrrolidone is preferred.

Alkali metal carboxylates which can be employed in the process of this invention can be represented by the formula $RCO_2M$ where R is a hydrocarbyl radical selected from alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl, said hydrocarbon radical having 1 to about 20 carbon atoms, and M is an alkali metal selected from the group consisting of lithium, sodium, potassium, rubidium and cesium. Preferably, R is an alkyl radical having 1 to about 6 carbon atoms or a phenyl radical and M is lithium or sodium, most preferably lithium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

The mole ratios of components employed relative to hydrogen sulfide as one are as follows:

| Component | Broad Range | Preferred Range |
|---|---|---|
| Alkali Metal Carbonate | 1.0 to 3.0 | 1.01 to 1.5 |
| Hydrogen Sulfide | 1 | 1 |
| Polyhalo-Subst. Aromatic Cpd. | 0.8 to 1.2 | .85 to 1.15 |

-continued

| Component | Broad Range | Preferred Range |
|---|---|---|
| Organic Amide | 2 to 10 | 3 to 6 |
| Alkali Metal Carboxylate | 0 to 1.0 | 0.25 to 0.51 |

The reaction conditions employed can vary. Temperatures can range from about 125°–450° C., preferably from about 175°–350° C. The reaction time can range from about 10 minutes to about 3 days, preferably from about 1 hour to about 8 hours. The pressure used is that sufficient to maintain the polyhalo-substituted aromatic compound and the organic amide substantially in the liquid phase.

EXAMPLE

A series of polymerization runs was carried out in a one liter stirred autoclave by charging to it a specified quantity of sodium carbonate monohydrate, N-methyl-2-pyrrolidone, p-dichlorobenzene, and anhydrous sodium acetate, if used, all at room temperature. The autoclave was sealed and pressure tested with dry nitrogen at about 415 to about 465 psia (2.8–3.2 MPa). If pressure tight, the nitrogen pressure was reduced to ambient pressure and the hydrogen sulfide admitted to the nitrogen-filled autoclave. The autoclave was then heated to about 500° to about 510° F. (260°–266° C.) and held at 4 hours or at 7 hours at that temperature during the polymerization. The maximum pressure attained in this series ranged from about 490–552 psia (3.38–3.81 MPa), depending upon the charge of components employed. Several runs were conducted at about 530° F. (277° C.) for either 4 hours or 8 hours. The maximum pressure attained in these runs ranged from about 552–589 psia (3.81–4.06 MPa).

The amount of free water liberated from the sodium carbonate monohydrate was calculated to range from about 3.3 weight percent to about 4.3 weight percent based on the total weight of components employed in the polymerization runs.

The quantities of reactants employed and the results obtained are presented in the Table. Appreviations or symbols used in the Table are as follows:

$Na_2CO_3 \cdot H_2O$—sodium carbonate monohydrate
$H_2S$—hydrogen sulfide
DCB—p-dichlorobenzene
NMP—N-methyl-2-pyrrolidone
$NaOA_c$—sodium acetate (anhydrous)

TABLE

Poly(p-Phenylene Sulfide) Production With Hydrogen Sulfide and Sodium Carbonate

| Run No.'s: | 1 | 2 | 3 | 4 | 5 | 6 | 7 | 8 |
|---|---|---|---|---|---|---|---|---|
| Reaction Conditions: | | | | | | | | |
| Avg Temp °C. | 262 | 261 | 264 | 265 | 266 | 265 | 277 | 276 |
| Time Hrs | 4 | 4 | 4 | 4 | 4 | 7 | 7 | 4 |
| Max Press MPa | 3.38 | 3.50 | 3.48 | 3.61 | 3.71 | 3.81 | 4.06 | 3.88 |
| $Na_2CO_3 \cdot H_2O$: | | | | | | | | |
| g | 130 | 130 | 130 | 130 | 130 | 130 | 130 | 186 |
| Moles | 1.05 | 1.05 | 1.05 | 1.05 | 1.05 | 1.05 | 1.05 | 1.50 |
| Mole Ratio $Na_2CO_3$: $H_2S$ | 1.95 | 1.82 | 1.79 | 1.67 | 1.58 | 1.57 | 1.57 | 2.49 |
| $H_2S$: | | | | | | | | |
| g | 18.3 | 19.7 | 20.0 | 21.4 | 22.7 | 22.8 | 22.8 | 20.5 |
| Moles | 0.537 | 0.578 | 0.587 | 0.628 | 0.666 | 0.669 | 0.669 | 0.602 |
| DCB: | | | | | | | | |
| g | 88.2 | 88.2 | 88.2 | 88.2 | 88.2 | 88.2 | 88.2 | 88.2 |
| Moles | 0.600 | 0.600 | 0.600 | 0.600 | 0.600 | 0.600 | 0.600 | 0.600 |
| Mole Ratio DCB: $H_2S$ | 1.12 | 1.04 | 1.02 | 0.955 | 0.901 | 0.897 | 0.897 | 0.997 |
| Anhydrous $NaOA_c$: | | | | | | | | |
| g | 0 | 0 | 24 | 24 | 24 | 24 | 24 | 24 |
| Moles | — | — | 0.293 | 0.293 | 2.293 | 0.293 | 0.293 | 0.293 |
| Mole Ratio $NaOA_c$: $H_2S$ | — | — | 0.499 | 0.467 | 0.440 | 0.438 | 0.438 | 0.487 |
| NMP: | | | | | | | | |
| g | 308.1 | 308.1 | 308.1 | 308.1 | 308.1 | 308.1 | 308.1 | 308.1 |
| Moles | 3.11 | 3.11 | 3.11 | 3.11 | 3.11 | 3.11 | 3.11 | 3.11 |
| Mole Ratio NMP: $H_2S$ | 5.79 | 5.38 | 5.30 | 4.95 | 4.67 | 4.65 | 4.65 | 5.17 |
| Polymer: | | | | | | | | |
| g | 33.6 | 36.9 | 37.0 | 35.8 | 40.3 | 41.2 | 40.8 | 32.8 |
| Yield % | 57.9 | 59.1 | 59.6 | 52.7 | 56.0 | 57.4 | 56.5 | 50.4 |

Inspection of the results shows successful polymerization runs were obtained at all of the various mole ratios of reactants employed.

I claim:
1. A method for producing polymers comprising:
   (a) contacting at polymerization conditions a reaction mixture consisting essentially of:
   (1) at least one polyhalo-substituted aromatic compound,
   (2) at least one organic amide,
   (3) at least one alkali metal carbonate,
   (4) $H_2S$, and
   (5) water in an amount up to 5 weight percent of the total of the other reaction mixture components, and
   (b) maintaining said reaction mixture at polymerization conditions for a time sufficient to produce polymer.
2. A method of claim 1 wherein at least one alkali metal carboxylate is present in the reaction mixture.
3. A method of claim 1 wherein said polyhalo aromatic compound is chosen from among compounds represented by the formula

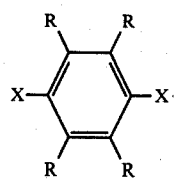

where each X is selected from the group consisting of chlorine, bromine, and iodine, and each R is selected from the group consisting of hydrogen and hydrocarbyl in which the hydrocarbyl is selected from the group consisting of alkyl, cycloalkyl, aralkyl, and combination thereof, with the total number of carbon atoms in each molecule being within the range of 6 to about 24, and with the proviso that in at least 50 mole percent of the p-dihalobenzene employed each R must be hydrogen.

4. A method of claim 1 wherein said organic amide is chosen from among the group consisting of cyclic and acyclic amides that have from 1 to about 10 carbon atoms per molecule.

5. A method of claim 1 wherein said alkali metal carbonate is chosen from among the group consisting of lithium carbonate, sodium carbonate, potassium carbonate, rubidium carbonate, cesium carbonate, and mixtures thereof.

6. A method of claim 2 wherein said alkali metal carboxylate is chosen from among those compounds represented by the formula $RCO_2M$ where R is a hydrocarbyl radical selected from alkyl, cycloalkyl, aralkyl, and combinations thereof, wherein said hydrocarbon radical has 1 to about 20 carbon atoms, and M is an alkali metal selected from the group consisting of lithium, sodium, potassium, rubidium, and cesium.

7. A method of claim 1 wherein the reactants are present in the reaction mixture and mole ratios of reactants relative to hydrogen sulfide as one of 1.0 to 3.0 to alkali metal carbonate, of 0.8 to 1.2 for polyhalo-substituted aromatic compound, and of 2 to 10 for organic amide.

8. A method of claim 2 wherein the reactants are present in the reaction mixture in a mole ratio of reactant relative to hydrogen sulfide as one of 1.0 to 3.0 for alkali metal carbonate, of 0.8 to 1.2 for polyhalo-substituted aromatic compound, of 2 to 10 for organic amide, and of any finite number up to 1 for alkali metal carboxylate.

9. A method of claim 1 wherein the reaction conditions for the polymerization are within a range of about 125° C. to about 450° C. for reaction temperature, of about 10 minutes to about 3 days for reaction time and a reaction pressure sufficient to maintain the polyhalo-substituted aromatic compound and the organic amide substantially in the liquid phase.

10. A method of claim 8 wherein said polyhalo-substituted aromatic compound is p-dichlorobenzene, and said organic amide is N-methyl-2-pyrrolidone, said organic metal carbonate is sodium carbonate, and said alkali metal carboxylate is sodium acetate.

* * * * *